(12) United States Patent
Luo et al.

(10) Patent No.: US 12,711,012 B2
(45) Date of Patent: Aug. 18, 2026

(54) METHODS, APPARATUSES, AND SYSTEMS FOR MANAGING PARITY DATA GENERATION IN A MEMORY SYSTEM

(71) Applicant: Yangtze Memory Technologies Co., Ltd., Wuhan (CN)

(72) Inventors: Xianwu Luo, Wuhan (CN); Jiangwei Shi, Wuhan (CN); Youxin He, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 34 days.

(21) Appl. No.: 18/885,169

(22) Filed: Sep. 13, 2024

(65) Prior Publication Data

US 2026/0037376 A1 Feb. 5, 2026

(30) Foreign Application Priority Data

Aug. 2, 2024 (CN) ........................ 202411061082.0

(51) Int. Cl.
*G06F 11/10* (2006.01)

(52) U.S. Cl.
CPC ...... *G06F 11/1056* (2013.01); *G06F 11/1068* (2013.01)

(58) Field of Classification Search
CPC .................................................. G06F 11/1056
See application file for complete search history.

(56) References Cited

U.S. PATENT DOCUMENTS

| | | | | |
|---|---|---|---|---|
| 5,530,948 A * | 6/1996 | Islam | G06F 11/1076 | 711/E12.019 |
| 5,720,025 A * | 2/1998 | Wilkes | G06F 11/1076 | 714/E11.034 |
| 5,860,090 A * | 1/1999 | Clark | G06F 11/1076 | 711/112 |
| 6,804,162 B1 * | 10/2004 | Eldridge | G06F 12/0893 | 365/230.01 |
| 7,822,921 B2 * | 10/2010 | Taylor | G06F 3/0611 | 714/801 |
| 7,934,055 B2 * | 4/2011 | Flynn | G06F 9/54 | 711/E12.001 |
| 8,458,515 B1 * | 6/2013 | Saeed | G06F 11/1076 | 714/6.24 |
| 9,804,843 B1 * | 10/2017 | Chu | G06F 30/343 | |
| 10,956,317 B2 * | 3/2021 | Pletka | G06F 12/0253 | |
| 2021/0096950 A1 * | 4/2021 | Kotzur | G06F 13/28 | |

* cited by examiner

*Primary Examiner* — Joseph D Torres
(74) *Attorney, Agent, or Firm* — Fish & Richardson P.C.

(57) ABSTRACT

Methods, systems, and computer-readable storage media for allocating memory space are provided. In one aspect, a method for operating a memory system includes writing data retrieved from a source block of a memory device of the memory system to a target block of the memory device. The method further includes, in response to determining a size of the data in the target block reaches a threshold, reading the data from the target block, generating parity data corresponding to the data, and writing the parity data to the target block.

9 Claims, 14 Drawing Sheets

METHODS, APPARATUSES, AND SYSTEMS FOR MANAGING PARITY DATA GENERATION IN A MEMORY SYSTEM

CROSS-REFERENCE TO RELATED APPLICATIONS

This application claims priority to Chinese Patent Application No. 202411061082.0, filed on Aug. 2, 2024, which is hereby incorporated by reference in its entirety.

TECHNICAL FIELD

The present disclosure generally relates to memory devices and memory systems, and in particular, to managing parity data generation in memory systems.

BACKGROUND

Flash memory is a low-cost, high-density, nonvolatile solid-state storage medium that can be electrically erased and reprogrammed. Flash memory includes NOR flash memory and NAND flash memory. Various operations can be performed by flash memory, for example, program (write) and erase operations, to change the threshold voltage of each memory cell to a respective level. For NAND flash memory, an erase operation can be performed at the memory block level, a program operation can be performed at the page level, and a read operation can be performed at the page level.

SUMMARY

The present disclosure involves methods, apparatuses, and systems for managing parity data generation in memory systems. One aspect of the present disclosure features an example method for operating a memory system. The method includes writing data retrieved from a source block of a memory device of the memory system to a target block of the memory device. The method further includes, in response to determining a size of the data in the target block reaches a threshold, reading the data from the target block, generating parity data corresponding to the data, and writing the parity data to the target block.

In some implementations, the target block includes a first set of pages associated with a first word line and a second set of pages associated with a second word line. Reading the data from the target block includes reading first data from a first page of the first set of pages, reading second data from a first page of the second set of pages.

In some implementations, the second word line is adjacent to the first word line in the memory device.

In some implementations, generating parity data includes generating first parity data. Generating the first parity data includes performing a first exclusive OR (XOR) operation on the first data and the second data.

In some implementations, a result of the first XOR operation is stored in a buffer of a memory controller of the memory system.

In some implementations, the method further includes reading third data from the source block. Generating the first parity data includes performing a second XOR operation on the third data and the result of the first XOR operation.

In some implementations, reading the data from the target block includes reading fourth data from a second page of the first set of pages, and reading fifth data from a second page of the second set of pages. The fourth data and the fifth data are read after writing the first parity data to the target block. Generating the parity data includes generating second parity data. Generating the second parity data includes performing a third XOR operation on the fourth data and the fifth data.

In some implementations, reading the data from the target block includes performing an error correction operation on the data using error correction codes.

One aspect of the present disclosure features a memory controller. The memory controller is coupled to a memory device including a source block and a target block. The memory controller includes a processor and a buffer. The memory controller is configured to perform operations including sending one or more first write commands that indicate to write data retrieved from the source block to the target block. The data includes first data and second data. The operations further include sending a first read command that indicates to read the first data from the target block, sending a second read command that indicates to read the second data from the target block, and sending a second write command that indicates to write first parity data to the target block. The first parity data are generated by performing an encoding operation on at least the first data and the second data.

In some implementations, the target block includes a plurality of pages numbered in sequence. The first data are read from a first page of the plurality of pages, and the second data are read from a second page of the plurality of pages. A number associated with the second page equals a number associated with the first page plus a pre-set integer. The pre-set integer is greater than 1.

In some implementations, performing the encoding operation includes performing an exclusive OR (XOR) operation on the first data and the second data.

In some implementations, a result of the XOR operation is stored in a buffer of the memory controller.

In some implementations, the operations further include, after sending the second read command, sending a third read command to read third data from the source block. The first parity data are generated by performing the encoding operation on at least the first data, the second data, and the third data.

In some implementations, the second write command indicates to write the third data and the first parity data to the target block.

In some implementations, the data further includes fourth data and fifth data. The operations include, after sending the second write command, sending a fourth read command that indicates to read the fourth data from the target block, sending a fifth read command that indicates to read the fifth data from the target block, sending a third write command that indicates to write second parity data to the target block. The second parity data are generated by performing an encoding operation on at least the fourth data and the fifth data.

In some implementations, the fourth data are read from a third page of the plurality of pages, and the fifth data are read from a fourth page of the plurality of pages. A number associated with the fourth page equals a number associated with the third page plus the pre-set integer.

In some implementations, the number associated with the third page immediately follows the number associated with the first page, and the number associated with the fourth page immediately follows the number associated with the second page.

In some implementations, the operations further include performing an error correction operation on the first data and the second data using error correction codes.

In some implementations, the first read command is sent in response to determining that a size of the data in the target block reaches a threshold.

One aspect of the present disclosure features a memory system. The memory system includes a memory device and a memory controller coupled to the memory device and configured to control the memory device. The memory system is configured to perform operations including writing data retrieved from a source block of the memory device to a target block of the memory device. The operations further include, in response to determining a size of the data in the target block reaches a threshold, reading the data from the target block, generating parity data corresponding to the data, and writing the parity data to the target block.

One aspect of the present disclosure features a non-transitory, computer readable medium. The non-transitory, computer readable medium stores one or more instructions executable by a memory system to perform operations including writing data retrieved from a source block of a memory device of the memory system to a target block of the memory device. The operations further include, in response to determining a size of the data in the target block reaches a threshold, reading the data from the target block, generating parity data corresponding to the data, and writing the parity data to the target block.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
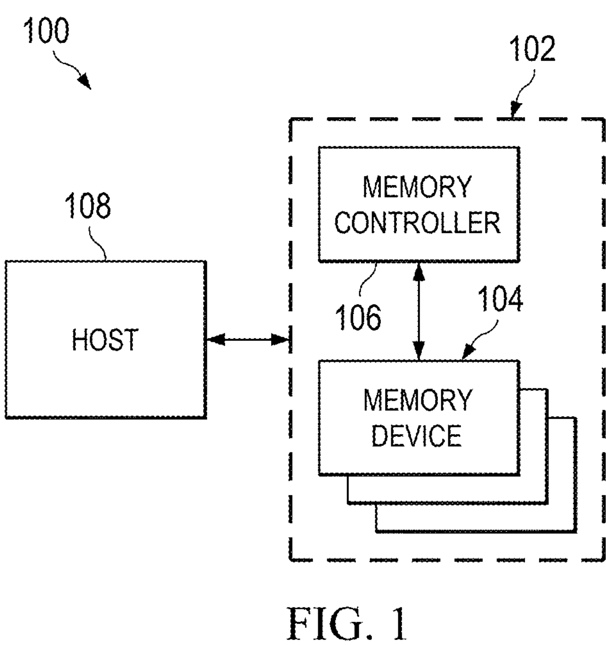
FIG. 1 illustrates a block diagram of an example system having a memory device, according to some aspects of the present disclosure.

This specification relates to memory controllers, memory systems, and methods for managing parity data generation in memory systems. Redundant-array-of-independent-disks (RAID) parity data can be used to recover data in case one word line fails. For example, a memory system can generate RAID parity data by performing exclusive or (XOR) operations on storage units across multiple word lines. As memory cell density in memory devices (e.g., NAND flash memory) escalates, the number of word lines in a memory device increases. As a result, the memory system may need more computational resources and larger parity buffers to generate RAID parity data.

In some cases, a static random-access memory (SRAM) in a memory controller of the memory system allocates part of its memory space as parity buffers. A large portion of the parity buffers are used for generating RAID parity data for host-write data (e.g., data received from the host and then written to the memory device). In comparison, a small portion of the parity buffers are used for generating RAID parity data for garbage-collection (GC) data (e.g., data retrieved from a source block of the memory device and then written to a target block of the memory device during a GC operation). In addition, it is difficult to increase the size of the SRAM, as it may increase the manufacturing cost of the memory system. As such, the parity buffers may not be enough to provide storage space for generating RAID parity data for GC data. In some cases, the memory system can perform swap operations between the parity buffers and the memory device, for example, to send intermediary results stored in the parity buffers to the memory device for temporary storage, so that the parity buffers can be used in a circular manner. However, swap operations can reduce the efficiency of GC operations and the performance of the memory system.

The present disclosure provides techniques to generate parity data for GC data. In some implementations, during a GC operation, the memory system writes GC data to the target block without generating corresponding RAID parity data. When data in the target block reaches a threshold size, the memory system can read data from the target block, for example, in order to detect and correct erroneous bits based on error correction codes. When reading the data from the target block, the memory system can generate RAID parity data for the data being read. The RAID parity data can then be stored in the target block. In some implementations, the memory system can read the data from the target block in an order different from a sequence of page numbers, for example, in an order that matches a sequence of the XOR operations. As such, less storage space is needed in the parity buffers to store the intermediary results of the XOR operations, so that fewer or no swap operations are needed.

The described techniques can achieve one or more technical effects. For example, the described techniques require less storage space in parity buffers, compared to the scenario where the memory system generates RAID parity data when writing GC data to the target block. As such, remaining storage space can be allocated for other modules and operations, which can increase the overall performance of the memory system. For another example, by applying the described techniques, the memory system can generate RAID parity data for GC data with fewer or no swap operations, which can maintain the efficiency of GC operations while providing data protection for GC data. In some implementations, additional or different technical effects can be achieved.

The above aspects and some other aspects of the present disclosure are discussed in greater detail below.

FIG. 1 illustrates a block diagram of an example system 100 having a memory device, according to some aspects of the present disclosure. The system 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, the system 100 can include a host 108 and a memory system 102 having one or more memory devices 104 and a memory controller 106. The host 108 can include one or more processors of an electronic device. The processor can be a central processing unit (CPU), or a system-on-chip (SoC), such as an application processor (AP). The host 108 can be configured to send or receive data and commands to or from the memory systems 102.

The memory device 104 can be any memory device disclosed in the present disclosure, such as a NAND Flash memory device. It is noted that the NAND Flash is only one example of memory device for illustrative purposes. It can include any suitable solid-state, non-volatile memory, e.g., NOR Flash, Ferroelectric RAM (FeRAM), Phase-change memory (PCM), Magneto-resistive random-access memory (MRAM), Spin-transfer torque magnetic random-access memory (STT-RAM), or Resistive random-access memory (RRAM), etc. In some implementations, memory device 104 includes a three-dimensional (3D) NAND Flash memory device.

The memory controller 106 can be implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described below in detail.

The memory controller 106 is coupled to the memory device 104 and to the host 108, and is configured to control the memory device 104, according to some implementations. The memory controller 106 can manage the data stored in the memory device 104 and can communicate with the host 108. In some implementations, the memory controller 106 is designed for operating in a low duty-cycle environment, such as secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid state drives (SSDs) or embedded multi-media-cards (eMMCs) used as data storage for mobile devices, such as smartphones, tablets, laptop computers, etc., and enterprise storage arrays. The memory controller 106 can be configured to control operations of the memory device 104, such as read, erase, and program operations. The memory controller 106 can also be configured to manage various functions with respect to the data stored or to be stored in the memory device 104 including, but not limited to bad-block management, garbage collection, logical-to-physical address conversion, logical-to-physical mapping management, wear leveling, etc. In some implementations, the memory controller 106 is further configured to process error correction codes (ECCs) with respect to the data read from or written to the memory device 104. Any other suitable functions can be performed by the memory controller 106 as well, for example, formatting the memory device 104.

The memory controller 106 can communicate with an external device (e.g., the host 108) according to a particular communication protocol. For example, the memory controller 106 can communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc. The memory controller 106 is configured to receive and transmit a command to and from the host 108, and execute or perform multiple functions and operations provided in the present disclosure, which will be described later.

Figure 2A:
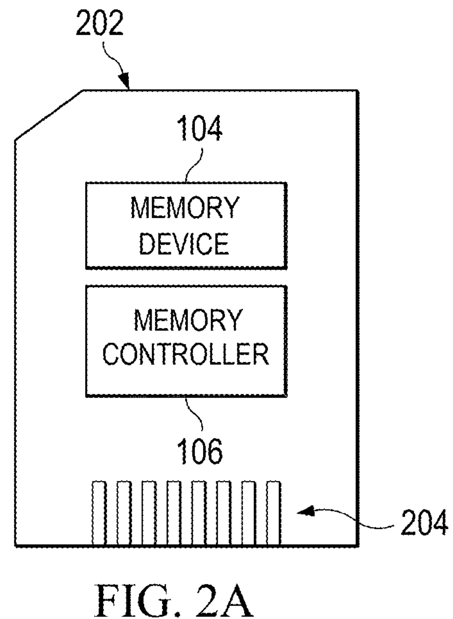
FIGS. 2A-2B illustrate example storage products, according to some aspects of the present disclosure.
Figure 2B:
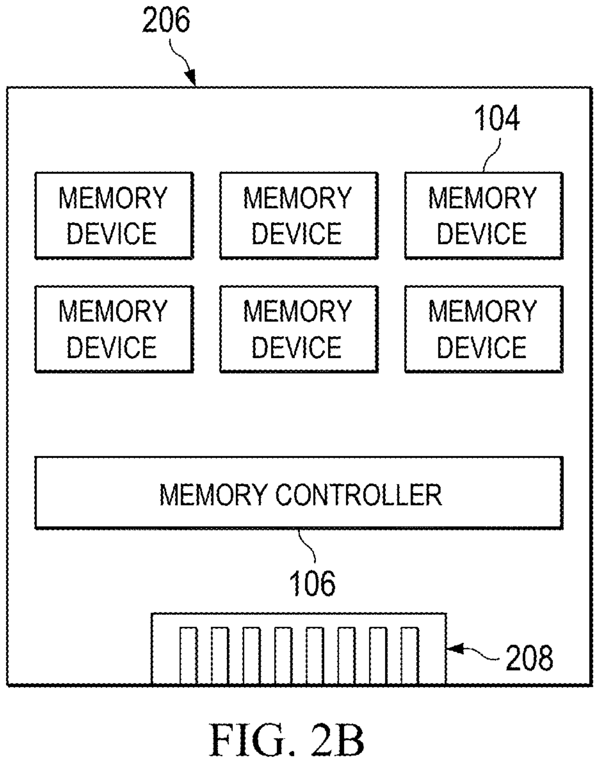

The memory controller 106 and the one or more memory devices 104 can be integrated into various types of storage devices. For example, the memory controller 106 and the one or more memory devices 104 can be packaged in a universal Flash storage (UFS) package or an eMMC package. In one example as shown in FIG. 2A, the memory controller 106 and a single memory device 104 can be integrated into a memory card 202. The memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. The memory card 202 can further include a memory card connector 204 coupling the memory card 202 with a host (e.g., host 108 in FIG. 1). In another example as shown in FIG. 2B, the memory controller 106 and multiple memory devices 104 can be integrated into an SSD 206. The SSD 206 can further include an SSD connector 208 that couples the SSD 206 with a host (e.g., host 108 in FIG. 1). In some implementations, the storage capacity and/or the operation speed of the SSD 206 is greater than those of the memory card 202.

Figure 3A:
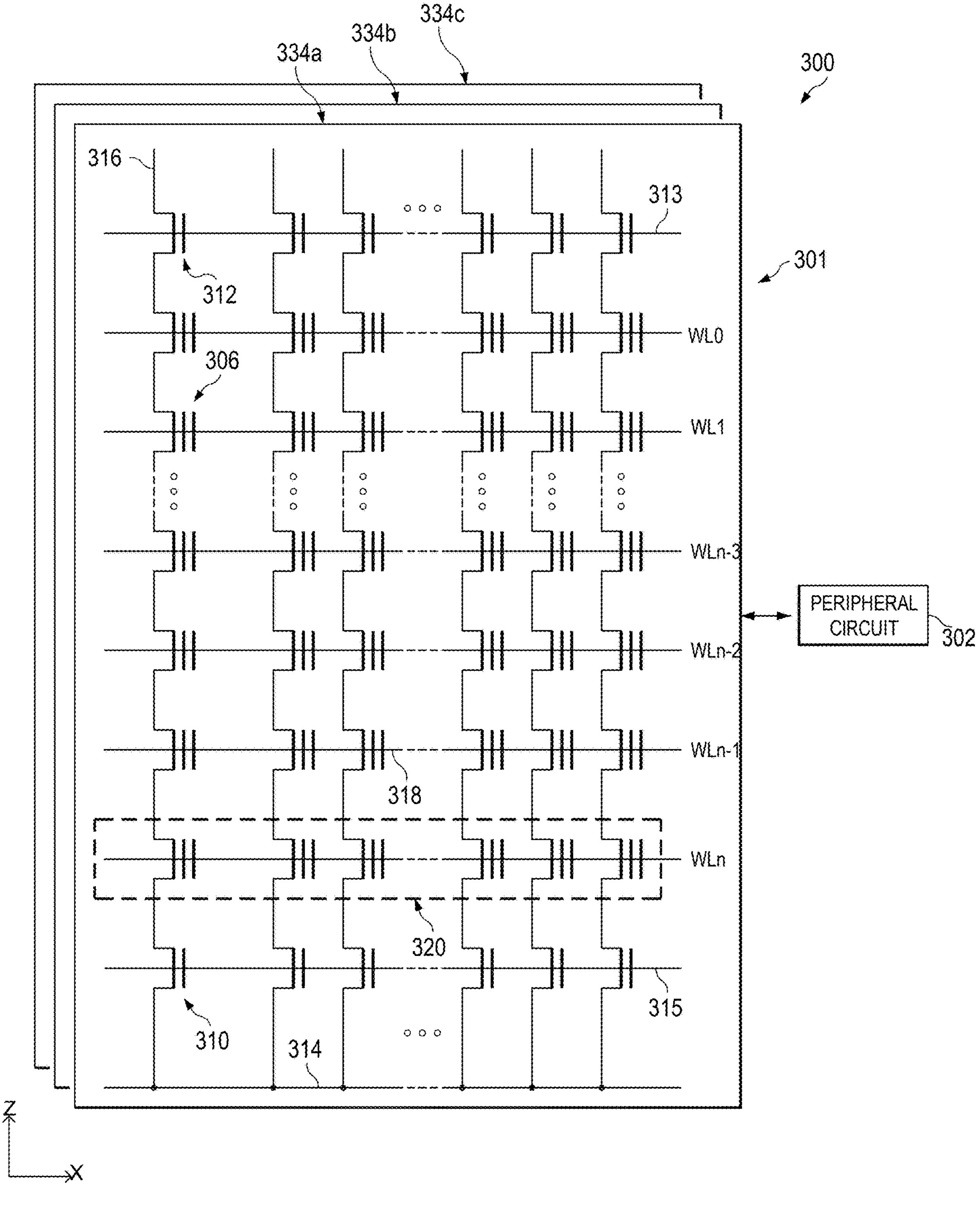
FIG. 3A illustrates an example of a schematic diagram of a memory device including peripheral circuits, according to some aspects of the present disclosure.

FIG. 3A illustrates an example of a schematic circuit diagram of a memory device 300, according to some aspects of the present disclosure. The memory device 300 can include a memory array 301 and peripheral circuits 302 coupled to the memory array 301. The memory array 301 can be a NAND flash memory array that includes NAND memory cells 306 arranged in rows and columns. In some implementations, memory cells 306 in a column (e.g., along z direction) of the memory array 301 are coupled in series and stacked vertically. Memory cells 306 in a row (e.g., along x direction) of the memory array 301 are coupled to and controlled by a word line 318. Each memory cell 306 can hold a continuous, analog value, such as an electrical voltage or charge that depends on the number of electrons trapped within a storage layer of the memory cell 306. The logic state (i.e., data) of each memory cell 306 can be determined based on the threshold voltage Vth of the memory cell 306. Each memory cell 306 can be a floating gate type memory cell including a floating-gate transistor, or a charge trap type memory cell including a charge-trap transistor.

In some implementations, each memory cell 306 is a single-level cell (SLC) with two possible memory states that can store one bit of data. For example, the first memory state "0" (e.g., erased state) can correspond to a first range of voltages, and the second memory state "1" (e.g., programmed state) can correspond to a second range of voltages. In some implementations, to increase storage capacity, each memory cell 306 can be a multi-level cell (MLC), a triple-level cell (TLC), or a quad-level cell (QLC). An MLC stores 2 bits of data, and has four logic states, logic {11, 10, 01, and 00}, i.e., erased state, and programmed states P1, P2, and P3. A TLC stores 3 bits of data, and has eight logic states, logic {111, 110, 101, 100, 011, 010, 001, 000}, i.e., erased state, and programmed states P1-P7. A QLC stores 4 bits of data and has 16 logic states, logic {1111, 1110, 1101, 1100, 1011, 1010, 1001, 1000, 0111, 0110, 0101, 0100, 0011, 0010, 0001, 0000}, i.e., erased state and programmed states P1-P15.

As shown in FIG. 3A, memory cells 306 in a column of the memory array 301 can be coupled to a source select gate (SSG) transistor 310 at its source end, and a drain select gate (DSG) transistor 312 at its drain end. The SSG transistor 310 and the DSG transistor 312 can be configured to activate selected columns of the memory array 301 during read and program operations. In some implementations, sources of the SSG transistors in the same memory block are coupled through a same source line 314 (a.k.a., common source line, CSL). The drain of each DSG transistor is coupled to a respective bit line 316. From the bit line 316, data can read from, or written to memory cells in the column of memory array 301. In some implementations, each column of the memory array 301 is configured to be selected or deselected by applying a DSG select voltage or a DSG unselect voltage to the gate of the respective DSG transistor 312 through one or more DSG lines 313, and/or by applying a select voltage or a unselect voltage to the gate of the respective SSG transistor 310 through one or more SSG lines 315.

In some implementations, memory cells of adjacent columns can be coupled through word lines 318. The word line 318 can select which row of the memory array 301 is affected by read and program operations. In some implementations, the memory cell 306 is a SLC, and each word line 318 is coupled to at least one physical page 320 of memory cells 306, which is the basic data unit for program operations. The size of one physical page 320 in bits is associated with the number of columns of memory cells coupled by word line 318 in a memory block. A physical page 320 can be associated with one or more virtual pages, according to the number of bits that a memory cell 306 can store. For example, when the memory cell 306 is a SLC that can store 1 bit of data, one physical page 320 is associated with one virtual page; when the memory cell 306 is an MLC that can store 2 bit of data, one physical page 320 is associated with two virtual pages; when the memory cell 306 is a TLC that can store 3 bit of data, one physical page 320 is associated with three virtual pages (e.g., a lower page, a middle page and a upper page); and when the memory cell 306 is a QLC that can store 4 bit of data, one physical page 320 is associated with four virtual pages. Virtual pages associated with the same physical page 320 share the same physical address. Each word line 318 can include a gate line coupled to a plurality of control gates (gate electrodes) of a plurality of memory cells 306 in the respective physical page 320. Example word lines shown in FIG. 3A include WL0, WL1, WLn−3, WLn−2, WLn−1, and WLn that are between DSG line 313 and SSG line 315.

In some implementations, the memory array 301 can include a plurality of memory blocks, and each memory block can include a plurality of memory strings 334. As shown in FIG. 3A, each memory string 334 can include memory cells 306 arranged in rows (e.g., coupled to word lines along x direction) and in columns (e.g., connected in series along z direction). SSG lines 315 of different memory strings 334, 334*a*, 334*b* in the same memory block are coupled together, so that each memory block can be selected or deselected by applying a select voltage or an unselect voltage to the SSG lines 315. DSG lines 313 of different memory string 334 are separate from each other, so that each memory string 334 in the memory block can be selected or deselected by applying a select voltage or an unselect voltage to the respective DSG lines 313. For example, a first memory string 334*a* can be selected by applying a select voltage to the DSG line 313; a second memory string 334*b* can be selected by applying a select voltage to a second DSG line (not shown in FIG. 3A) coupled to DSG transistors in the memory string 334*b*; and a third memory string 334*c* can be selected by applying a select voltage to a third DSG line (not shown in FIG. 3A) coupled to DSG transistors in the memory string 334*c*.

Peripheral circuits 302 can be coupled to memory array 301 through bit lines 316, word lines 318, source lines 314, SSG lines 315, and DSG lines 313. Peripheral circuits 302 can include any suitable analog, digital, and mixed-signal circuits for facilitating the operations of memory array 301 by applying and sensing voltage signals and/or current signals to and from each target memory cell 306 through bit lines 316, word lines 318, source lines 314, SSG lines 315, and DSG lines 313. Peripheral circuits 302 can include various types of peripheral circuits formed using metal-oxide-semiconductor (MOS) technologies.

Figure 3B:
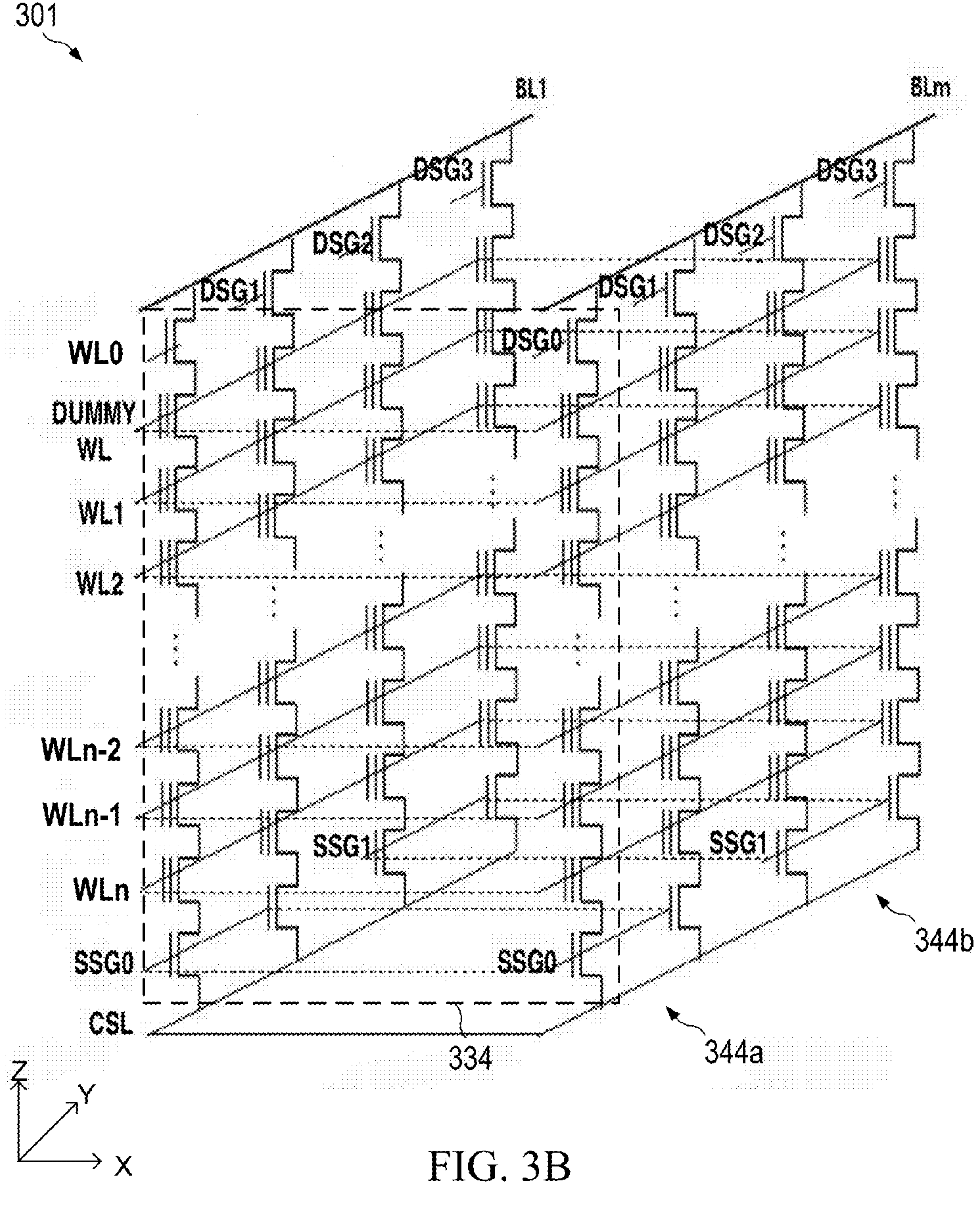
FIG. 3B illustrates an example of a schematic diagram of a memory array including memory strings, according to some aspects of the present disclosure.

FIG. 3B illustrates an example of a schematic diagram of the memory array 301 including memory string 334, according to some aspects of the present disclosure. In some implementations, each memory block can serve as a basic data unit for erase operations, such that memory cells 306 on the same memory block are erased at the same time. To erase memory cells 306 in a selected memory block, the source line 314 coupled to the selected memory block can be biased with an erase voltage. For example, the erase voltage can be a high positive voltage (e.g., 20 V or more). In some implementations, an erase operation can be performed at a half-memory block level, a quarter-memory block level, or a level having any suitable number of memory blocks or fractions of a memory block.

A memory block can include a plurality of memory strings 334. In some implementations, a memory block can be divided into fingers 344. Each finger 344 can include one or more memory strings 334. SSG transistors 310 of memory strings 334 in the same finger 344 are coupled to the same SSG line 315. For example, SSG transistors 310 of memory strings 334 of the first finger 344*a* are coupled to a first SSG line represented by SSG0; SSG transistors 310 of memory strings 334 of the second finger 344*b* are coupled to a second SSG line represented by SSG1.

In some implementations, DSG transistors 312 in different memory strings 334 are coupled to different DSG lines 313. For example, DSG transistors 312 of a first memory string in the memory block are coupled to a first DSG line represented by DSG0; DSG transistors 312 of a second memory string in the memory block are coupled to a second DSG line represented by DSG1; DSG transistors 312 of a third memory string in the memory block are coupled to a third DSG line represented by DSG2; and DSG transistors 312 of a fourth memory string in the memory block are coupled to a fourth DSG line represented by DSG3.

In some implementations, memory cells 306 in adjacent memory strings 334 can be coupled through word lines.

Example word lines shown in FIG. 3B include WL0, WL1, WL2, WLn−2, WLn−1, and WLn between DSG line and SSG line. For example, memory cells 306 of the same vertical position (e.g., along z direction) in all memory strings 334 in the memory block are coupled to the same word line. That is, a word line is coupled to corresponding pages of all memory strings 334 of the memory block.

In some implementations, the memory block can include a different number of fingers 344, and each finger 344 can include a different number of memory strings 334. In some implementations, the memory strings 334 are not arranged in to fingers 344, for example, by coupling SSG transistors of all memory strings 334 of the memory block to the same SSG line.

Figure 4:
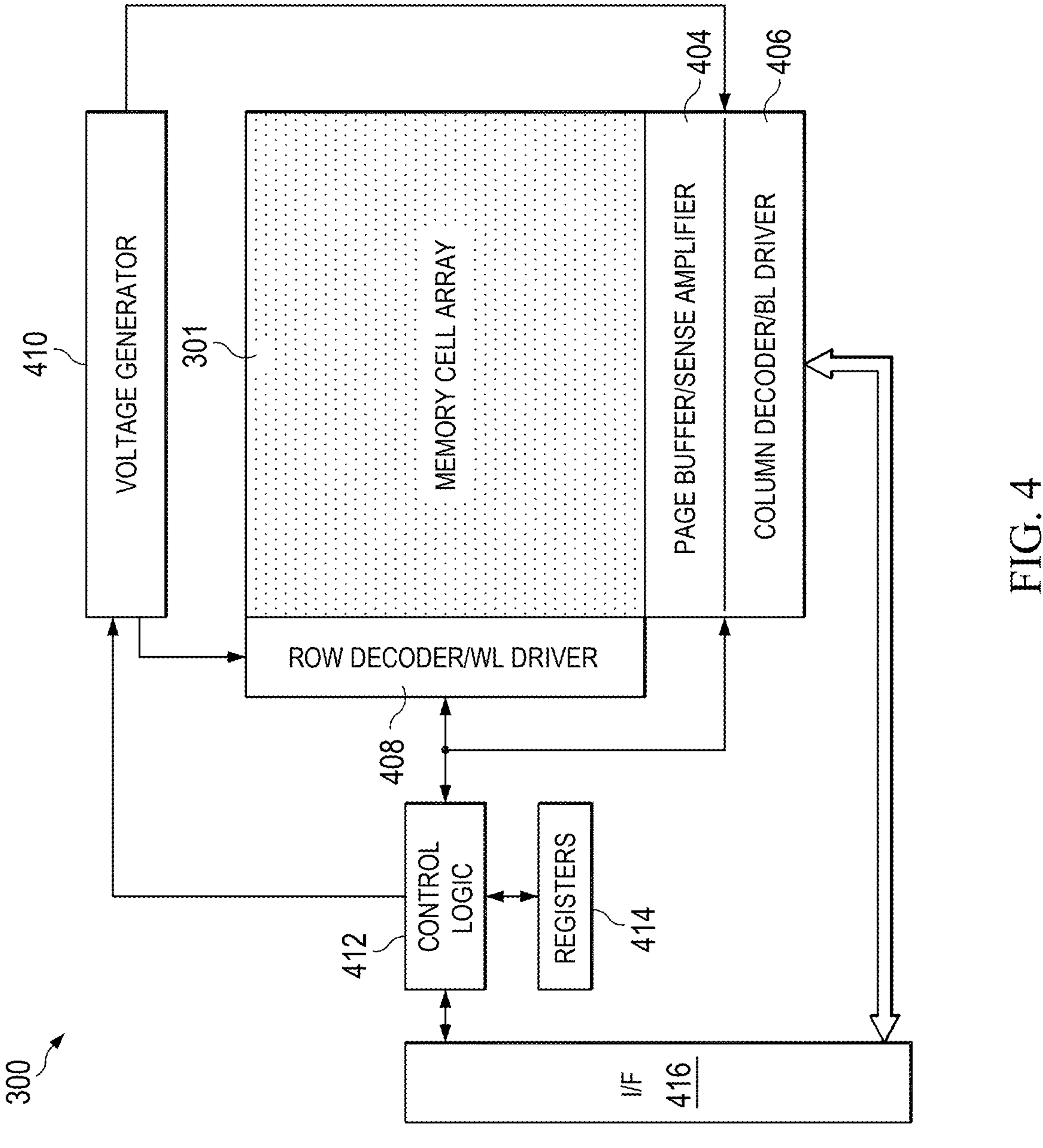
FIG. 4 illustrates some example peripheral circuits, according to some aspects of the present disclosure.

FIG. 4 illustrates some example peripheral circuits 302, according to some aspects of the present disclosure. The peripheral circuits 302 can be coupled to the memory array 301 through bit lines 316, word lines 318, source lines 314, SSG lines 315, and DSG lines 313. The peripheral circuits 302 can include any suitable analog, digital, and mixed-signal circuits for facilitating the operations of the memory array 301 by applying and sensing voltage signals and/or current signals to and from each target memory cell 306 through bit lines 316, word lines 318, source lines 314, SSG lines 315, and DSG lines 313. The peripheral circuits 302 can include various types of peripheral circuits formed using metal-oxide-semiconductor (MOS) technologies. The example peripheral circuits 302 include a page buffer/sense amplifier 404, a column decoder/bit line driver 406, a row decoder/word line driver 408, a voltage generator 410, control logic 412, registers 414, an interface 416, and a data bus. In some examples, additional peripheral circuits not shown in FIG. 4 may be included as well.

The page buffer/sense amplifier 404 can be configured to read and program (write) data from and to memory array 301 according to the control signals from control logic 412. In an example, the page buffer/sense amplifier 404 may store one page of program data (write data) to be programmed into one physical page 320 of the memory array 301. In another example, the page buffer/sense amplifier 404 may perform program verify operations to ensure that the data have been properly programmed into memory cells 306 coupled to selected word lines 418. In still another example, the page buffer/sense amplifier 404 may also sense the low power signals from the bit line 316 that represents a data bit stored in memory cell 306, and amplify the small voltage swing to recognizable logic levels in a read operation. The column decoder/bit line driver 406 can be configured to be controlled by the control logic 412 and select one or more NAND memory strings 308 by applying bit line voltages generated from the voltage generator 410.

The row decoder/word line driver 408 can be configured to be controlled by the control logic 412 and select/deselect memory blocks of the memory array 301 and select/deselect word lines 418 of the memory block. The row decoder/word line driver 408 can be further configured to drive word lines 418 using word line voltages generated from the voltage generator 410. In some implementations, the row decoder/word line driver 408 can also select/deselect and drive SSG lines 315 and DSG lines 313. As described below in detail, the row decoder/word line driver 408 is configured to apply a program voltage to selected word line 418 in a program operation on memory cell 306 coupled to selected word line 418.

The voltage generator 410 can be configured to be controlled by the control logic 412 and generate the word line voltages (e.g., read voltage, program voltage, pass voltage, local voltage, verify voltage, etc.), bit line voltages, and source line voltages to be supplied to the memory array 301.

The control logic 412 can be coupled to each peripheral circuit described above and configured to control operations of each peripheral circuit. The registers 414 can be coupled to the control logic 412 and include status registers, command registers, and address registers for storing status information, command operation codes (OP codes), and command addresses for controlling the operations of each peripheral circuit.

The interface 416 can be coupled to the control logic 412 and act as a control buffer to buffer and relay control commands received from a host (not shown) to the control logic 412 and status information received from the control logic 412 to the host. The interface 416 can also be coupled to the column decoder/bit line driver 406 via a data bus, and act as a data input/output (I/O) interface and a data buffer to buffer and relay data to and from the memory array 301.

Figure 5:
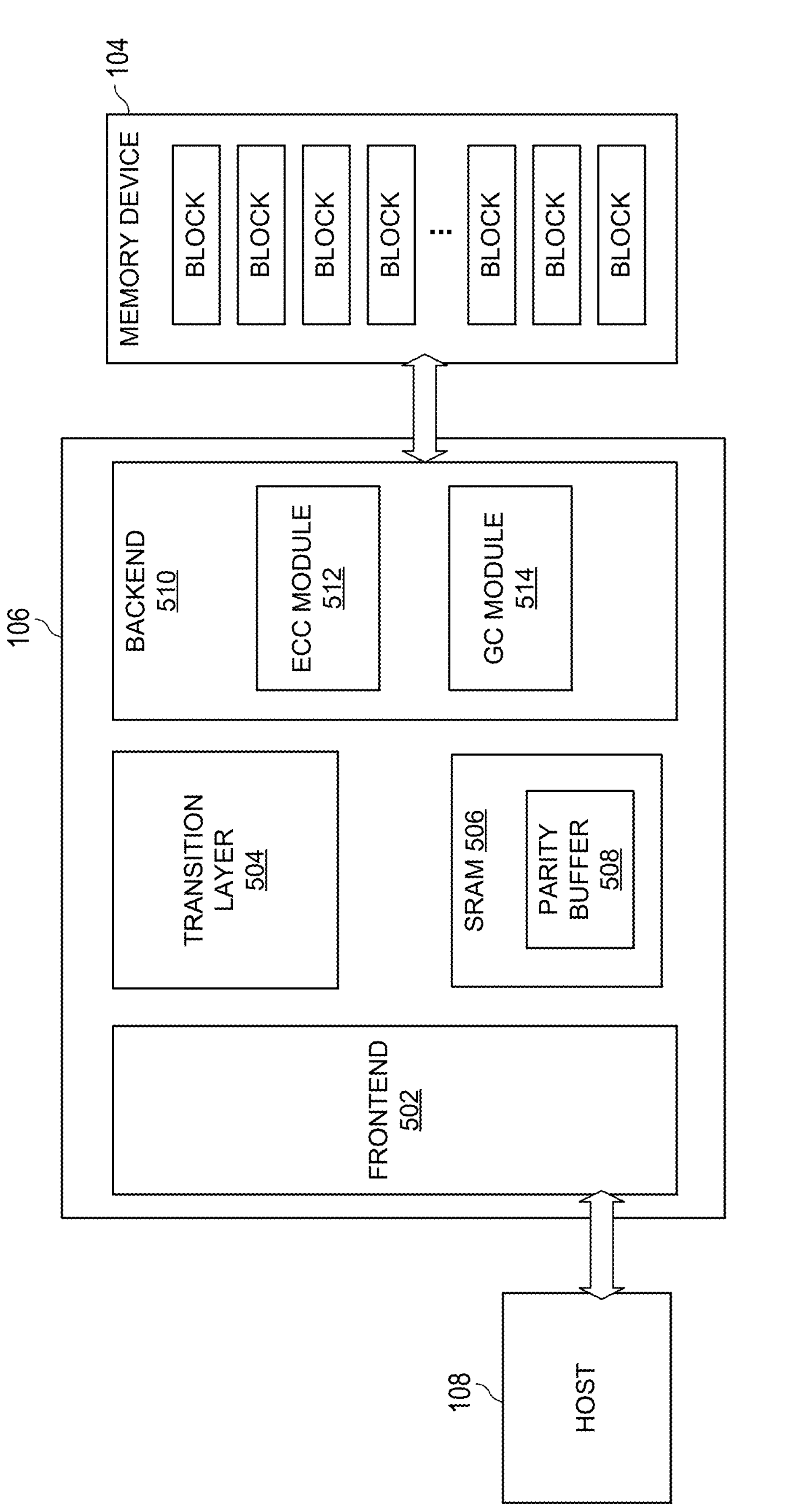
FIG. 5 illustrates an example of a block diagram of a memory controller interacting with a host and a memory device, according to some aspects of the present disclosure.

FIG. 5 illustrates an example of a block diagram of a memory controller 106 interacting with a host 108 and a memory device 104, according to some aspects of the present disclosure.

In some implementations, the memory device 104 can be managed under a redundant array of independent disks (RAID) algorithm, which employs techniques of striping, mirroring, and/or parity to create large reliable data storing from multiple storage units. For example, the memory device can include multiple dies, each having multiple planes. Each plane is divided into multiple memory blocks. The RAID algorithm can employ stripping in the memory blocks to divide the memory data in the memory blocks into a plurality of data portions, and perform exclusive or (XOR) operations amongst data portions in a stripe to generate respective RAID parity data. One data portion can represent data in one virtual page. One stripe often includes data portions located in two dimensions, e.g., laterally in different memory blocks across different dies and different planes, and vertically in different levels in the same memory blocks. For example, for memory blocks in 4 planes and 4 dies, a stripe can include 128 data portions, distributed laterally (e.g., in all the planes and dies) and vertically (e.g., in more than one level). Laterally, the stripe can include data portions at the same locations in different planes. Vertically, the stripe can include data portions at the same locations in different levels. The last data portion often includes the RAID parity data of the stripe. In case of programming failure in one data portion of a stripe, the compromised data portion can be recovered, e.g., by performing XOR operations, using the parity data of the stripe and the rest of the data portions in the stripe. For example, for a stripe that has 128 data portions, 127 data portions are used to store the memory data, and one data portion is used to store the parity data of the stripe, the error correction capability using such striping configuration can thus be described as (127+1).

In some implementations, memory blocks (e.g., physical memory blocks) of the memory device 104 are arranged into super blocks (a.k.a., virtual blocks) in accordance with the applied RAID algorithm. For example, a super block can include memory blocks of the same position in multiple planes and/or multiple dies.

The memory controller can include a frontend 502, a transition layer 504, a Static Random-Access Memory (SRAM) 506, and a backend 510. The SRAM 506 can include one or more parity buffers 508. The backend 510 can include an error-correction code (ECC) module 512, and a garbage collection (GC) module 514. In some examples, additional components not shown in FIG. 5 may be included in the memory controller 106 as well.

The frontend 502 can be configured to handle communications between the host 108 and the memory controller 106. In some implementations, the frontend 502 can communicate with the host 108 according to a particular communication protocol. For example, the frontend 502 can communicate with the host 108 through at least one of various interface protocols, such as a USB protocol, an MMC protocol, a PCI protocol, a PCI-E protocol, an ATA protocol, a serial-ATA protocol, a parallel-ATA protocol, a SCSI protocol, an ESDI protocol, an IDE protocol, a Firewire protocol, etc. In some implementations, the frontend 502 can receive a request from the host 108 and forward the request to the backend 510 via the transition layer 504, so that the backend 510 can fulfill the request. Examples of a request can include, but are not limited to, a read request to read data stored in a block of memory device 104, a write request to erase data stored in a block of memory device 104 and to write new data into the block, a reformatting request to reformat the memory device 104, or any other suitable request. In some implementations, the frontend 502 can receive data from the backend 510 via the transition layer 504, and send the data to the host 108.

The transition layer 504 can be configured to handle communications between the frontend 502 and the backend 510. The transition layer 504 can act as an intermediate layer between the frontend 502 and the backend 510.

The backend 510 can be configured to fulfill requests from host 108. In some implementations, backend 510 can receive a request from the host 108 via the frontend 502 and the transition layer 504, and perform one or more operations to fulfill the request. For example, backend 510 can be configured to control operations of memory device 104 (e.g., read, erase, or program operations) in response to receiving a request from host 108 (e.g., a read request, an erasing request, or a programming request). The backend 510 can also be configured to manage various functions with respect to the data stored or to be stored in the memory device 104 including, but not limited to, bad-block management, error correction, or garbage collection, etc.

The GC module 514 in the backend 510 can be configured to migrate data from a source block (e.g., a source physical memory block, or a source super block) to a target block (e.g., a target physical memory block, or a target super block), so that the source block can be erased to be available for writing new data. For example, the GC module 514 can be configured to select a source block and a target block in the memory device 104, read valid data from the source block by sending read commands to the memory device 104, writing the valid data to the target block by sending write commands to the memory device 104, and then erasing the source block.

The ECC module 512 in the backend 510 can be configured to process error correction codes with respect to the data read from or written to the memory device 104. Example error correction codes can include, but are not limited to, Hamming codes, Reed-Solomon codes, low-density parity check (LDPC) codes, etc. For example, the backend 510 can read data from a block of memory device 104 in response to a read request, and process error correction codes to determine whether data stored in the block is read successfully (e.g., with no errors). If the data stored in the block is read successfully, the backend 510 can forward the data to the frontend 502 via the transition layer 504, so that the frontend 502 can return the data to the host 108. However, if the data stored in the block is not read successfully, the backend 510 can generate data describing a read error on the block.

In some implementations, the ECC module 512 can be further configured to handle the read error on the block. For example, the ECC module 512 can be configured to implement a set of error handling mechanisms to handle the read error on the block. If the data stored in the block can be read successfully by applying the set of error handling mechanisms, the ECC module 512 can return the data to host 108. In some cases, if the data stored in the block cannot be read successfully by applying the set of error handling mechanisms, the ECC module 512 can perform a memory test on the block to determine whether the block malfunctions (e.g., whether the block is a bad block). The ECC module 512 can update a mapping table of memory device 104 by adding a newly discovered bad block to the mapping table. The mapping table can be used to record any bad blocks of memory device 104, and can be stored in memory device 104 or a storage medium of memory controller 106.

For example, LDPC codes can be used for error correction purposes with respect to the data read from or written to memory device 104. As a result, an LDPC hard decoding strategy or an LDPC soft decoding strategy can be used during a decoding process for data read from memory device 104. The set of error handling mechanisms can include, but not limited to, one or more of the following: (1) a first mechanism that uses a default read voltage to read the data stored in the block and applies the LDPC hard decoding strategy for data decoding; (2) a second mechanism that uses a set of read voltages in a read-retry table to read the data stored in the block and applies the LDPC hard decoding strategy for data decoding; (3) a third mechanism that uses one or more shifted read voltages to read the data stored in the block and applies the LDPC soft decoding strategy for data decoding; and (4) a fourth mechanism that uses a RAID parity data restoration strategy to handle the read error on the block.

The SRAM 506 can be configured to temporarily store data transmitted between the host 108 and the memory device 104. For example, as the host 108 writes data into memory device 104, or the host 108 reads data from the memory device 104, the SRAM 506 can temporarily store page data corresponding to one word line, or parity data corresponding to one word line. The SRAM 506 can include one or more parity buffers 508 configured to store RAID parity data and garbage collection (GC) data. In some implementations, each parity buffer 508 may have a limited memory space (e.g., 320 KB). In case that the RAID parity data and GC data exceeds the memory space of the parity buffer 508, the memory controller 106 can perform a swap operation, e.g., sending the RAID parity data and GC data in the parity buffer 508 to the memory device 104 for temporary storage, and retrieve RAID parity data and GC data from the memory device 104 when needed.

In some implementations, the SRAM 506 can further include a read buffer configured to temporarily store data that are read from the memory device 104, a copy buffer configured to temporarily store data to be written to the memory device 104, or the like.

Figure 6A:
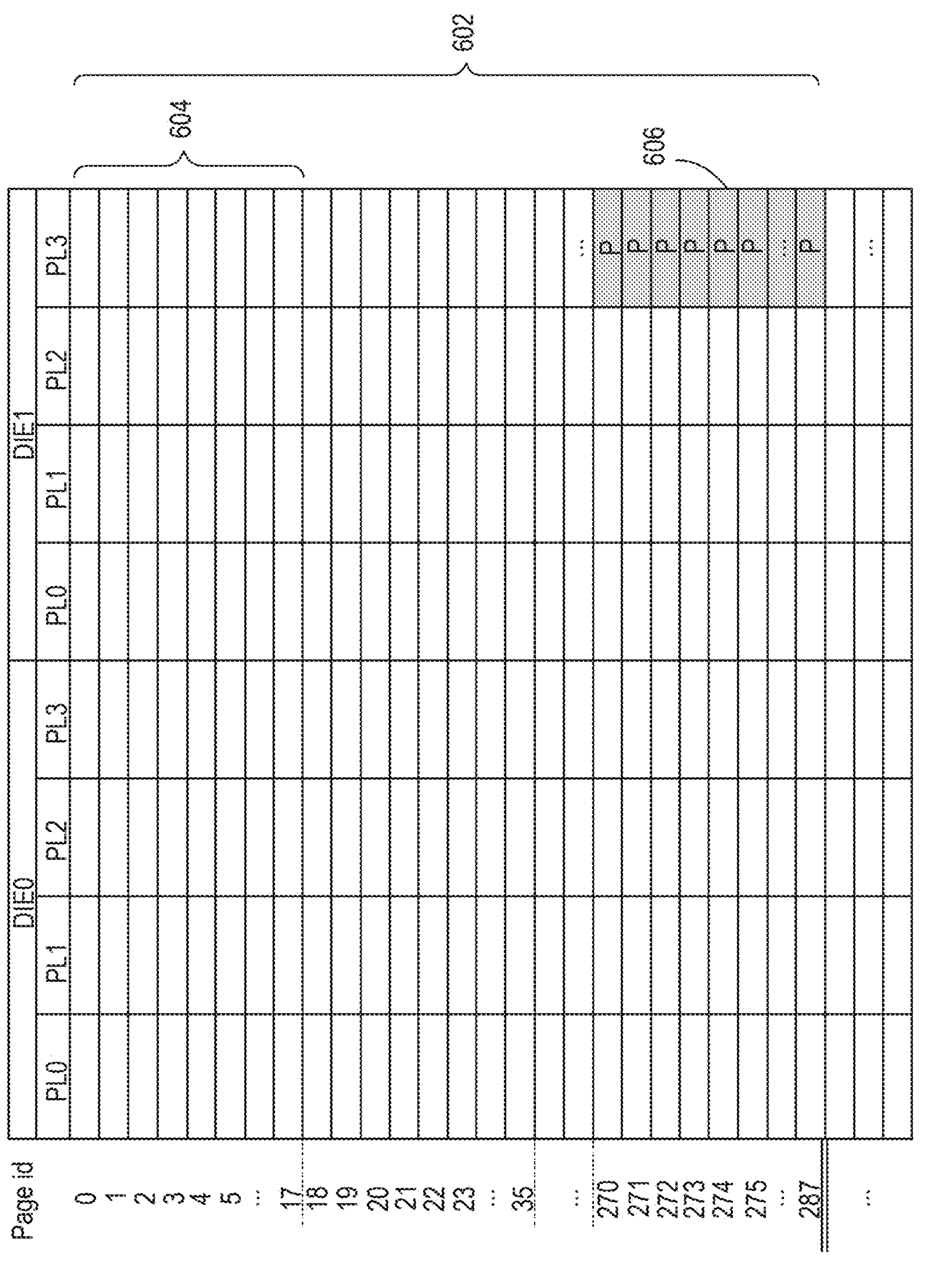
FIGS. 6A-6B illustrate an example data structure of a super block of a memory device, according to some aspects of the present disclosure.

FIG. 6A illustrates an example data structure of a super block 600 of a memory device, according to some aspects of the present disclosure. The super block 600 can include memory blocks of multiple planes and multiple dies. As an example, a memory device can include 2 dies (e.g., DIE 0 and DIE 1), and each die includes 4 planes (e.g., PLANES 0-3). Memory blocks of the same position in each plane are grouped together to form the super block 600. Further, within the super block, pages of the same position in each memory block (e.g., pages with the same page number in each memory block) can be grouped together to as a super page. For example, each row in the super block 600 is a super page.

In some implementations, the super block 600 can be divided into one or more funds 602, and each fund can include a plurality of rounds 604. Each round 604 can include a pre-set number of super pages.

Figure 6B:
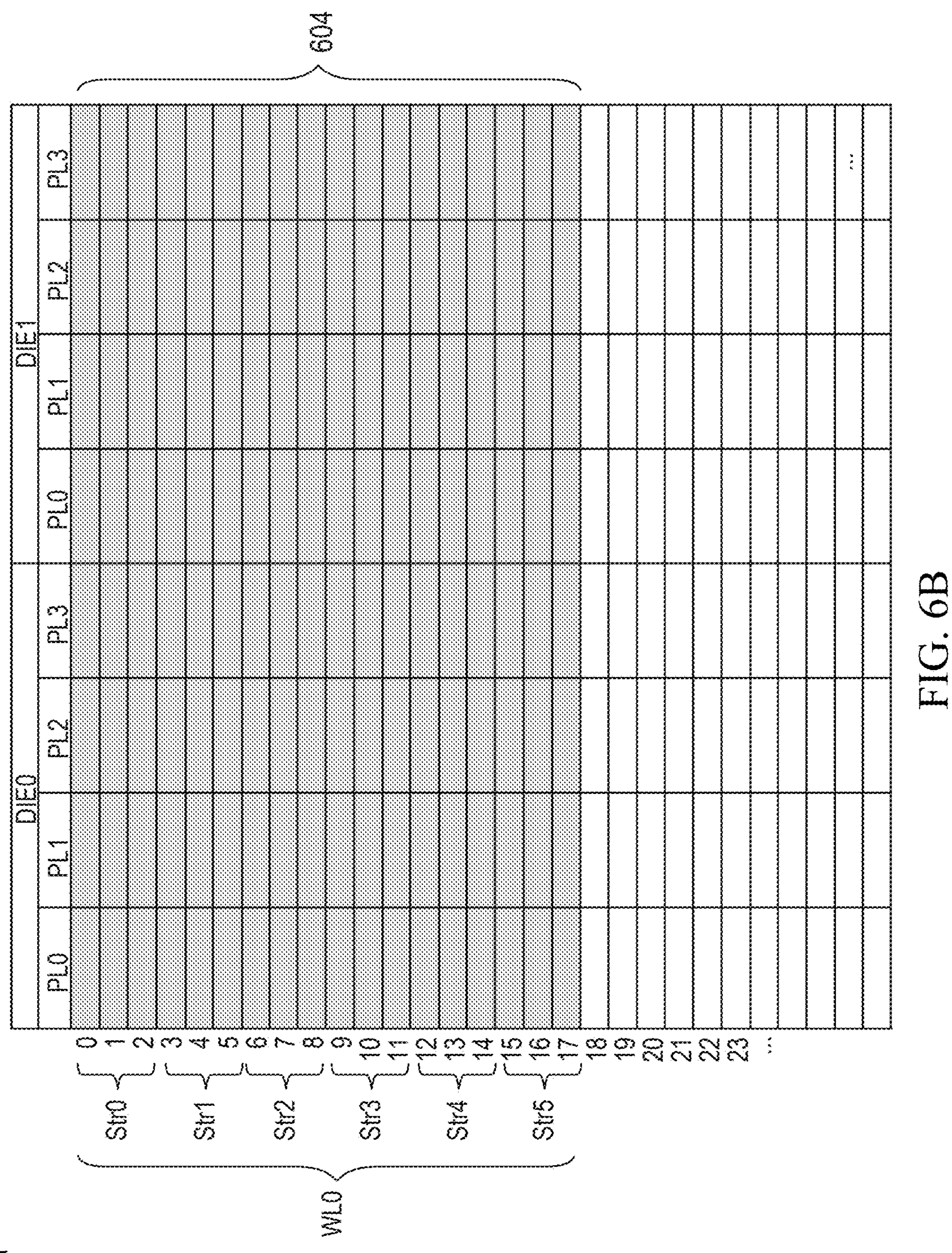

In some implementations where the RAID algorithm employs a "single word line" protection, each round includes super pages associated with one word line. As an example, as shown in FIG. 6A, in a TLC memory device where each memory block includes 6 memory strings, each word line is coupled with 6 physical pages, and each physical page corresponds to 3 virtual pages (e.g., an upper page, a middle page, and a lower page). Each word line is therefore associated with 18 virtual pages. As such, one round 604 in the super block can include 18 virtual pages of each memory block, and thus 18 super pages. For example, super pages 0-17 form the first round 604*a*, and super pages 18-35 form the second round, and so on. As shown in FIG. 6B, the first round 604*a* can include 18 super pages (super pages 0-17) associated with the same word line (e.g., WL0). Super pages 0-2 are associated with a first string (string 0), super pages 4-5 are associated with a second string (string 1), super pages 6-8 are associated with a third string (string 2), super pages 9-11 are associated with a fourth string (string 3), super pages 12-14 are associated with a fifth string (string 4), and super pages 15-17 are associated with a sixth string (string 5). As another example, in a QLC memory device where each memory block includes 4 memory strings, each word line is associated with 16 virtual pages.

In some implementations where the RAID algorithm employs a "double word line" protection, each round includes super pages associated with two adjacent word lines.

Each fund 602 can include a pre-set number of rounds 604, for example, according to error correction capacity of the RAID parity data 606 (e.g., the ratio of memory data to corresponding RAID parity data). As an example shown in FIG. 6A, each fund 602 includes 16 rounds 604. RAID parity data 606 are stored in designated data portions in the super block 600. In this example, RAID parity data 606 are stored in the data portions located in PLANE 3 of DIE 1 of the last round, while memory data are stored in other data portions in the super block 600. As such, the ratio of data portions that store memory data to data portions that store RAID parity data 606 can be calculated as 127:1.

The super block 600 can be a target block 700 that stores migrated data from a source block during a garbage collection (GC) operation. RAID parity data 606 corresponding to the migrated data are generated by performing XOR operations on the migrated data, and then stored in the super block 600. FIGS. 7A-7D illustrate example data structures of the target block 700 during a RAID encoding operation on data migrated by the GC operation, according to some aspects of the present disclosure. Super pages in the target block 700 are organized in rounds 704*a*, 704*b*, 704*n* (collectively as 704) and funds 702, where a fund 702 can include a set of rounds 704, and each round 704 can include a set of super pages.

Figure 7A:
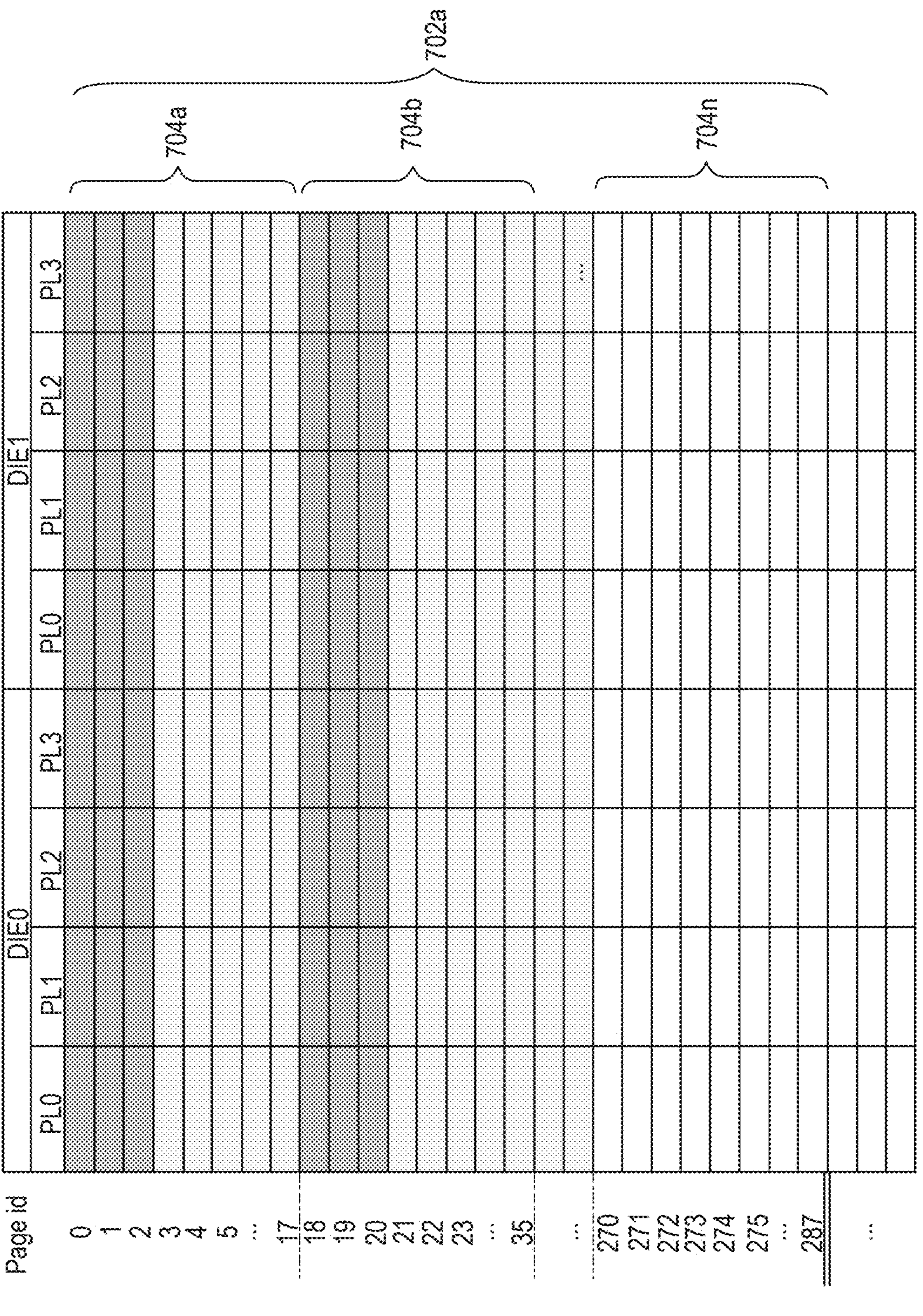
FIGS. 7A-7D illustrate example data structures of a target block during a RAID encoding operation on data migrated by a GC operation.

As shown in FIG. 7A, the GC operation includes writing data retrieved from the source block into the target block 700. In some implementations, data are written to super pages of the target block 700 in sequence, e.g., from super page 0, super page 1, . . . , to super page N. Before data size in the target block 700 reaches a pre-set threshold, XOR operations are not performed when writing data, and thus no RAID parity data are generated. For example, as shown in FIG. 7A, during the GC operation, data retrieved from the source block are first written to the first 15 rounds of the first fund 702*a* (e.g., super pages 0-269) without generating corresponding RAID parity data.

When the data size in the target block 700 reaches the pre-set threshold (e.g., when data are written in super pages in all the rounds 704 except the last round 704*n* of the first fund 702*a*), the GC operation proceeds to reading data from the target block 700. The memory controller can perform XOR operations on the data being read to generate corresponding RAID parity data. In some implementations, the memory controller can also perform error correction operations on the data being read based on error correction codes (e.g., one of Hamming codes, Reed-Solomon codes, or LDPC codes).

In some implementations, data are not read from the super pages of the target block 700 in sequence of the page numbers. Instead, data can be read from the super pages in an order that matches a sequence of XOR operations for generating RAID parity data. As such, less storage space is needed in the parity buffers to store the intermediary results of the XOR operations, so that fewer or no swap operations are needed.

As an example, in a first cycle of the RAID encoding operation, data in the first three super pages of each round 704 are read, so that the memory controller can generate corresponding RAID parity data by performing XOR operations on the data being read. For example, data in super pages 0-2 of the first round 704*a* are read and stored in one or more parity buffers of the memory controller. In some implementations, super pages 0-2 are each associated with one of a lower page, a middle page or an upper page of a TLC memory array. Data in the super page (e.g., super page 0) associated with the lower page are stored in a first parity buffer (e.g., parity buffer 0), data in the super page (e.g., super page 1) associated with the middle page are stored in a second parity buffer (e.g., parity buffer 1), and data in the super page (e.g., super page 2) associated with the upper page are stored in a third parity buffer (e.g., parity buffer 2). After reading the data in super pages 0-2 of the first round 704*a*, data in super pages 18-20 of the second round 704*b* are read and stored in the parity buffers. For example, data in super page 18 are stored in parity buffer 0, data in super page 19 are stored in parity buffer 1, and data in super page 20 are stored in parity buffer 2. Similarly, data in the first three super pages of the third round to the second last round can be read and stored in the parity buffers.

The memory controller can perform XOR operations on the data stored in the parity buffers to generate corresponding RAID parity data. For example, the memory controller can perform an XOR operation on super page 0, super page 18, super page 36, . . . , and super page 252, which are stored in parity buffer 0. The result of the XOR operation can also be stored in parity buffer 0. Similarly, the memory controller can perform an XOR operation on super page 1, super page 19, super page 37, . . . , and super page 253, which are stored in parity buffer 1, and then store the result of the XOR operation in parity buffer 1. The memory controller can perform an XOR operation on super page 2, super page 20, super page 38, . . . , and super page 254, which are stored in parity buffer 2, and then store the result of the XOR operation in parity buffer 2.

Figure 7B:
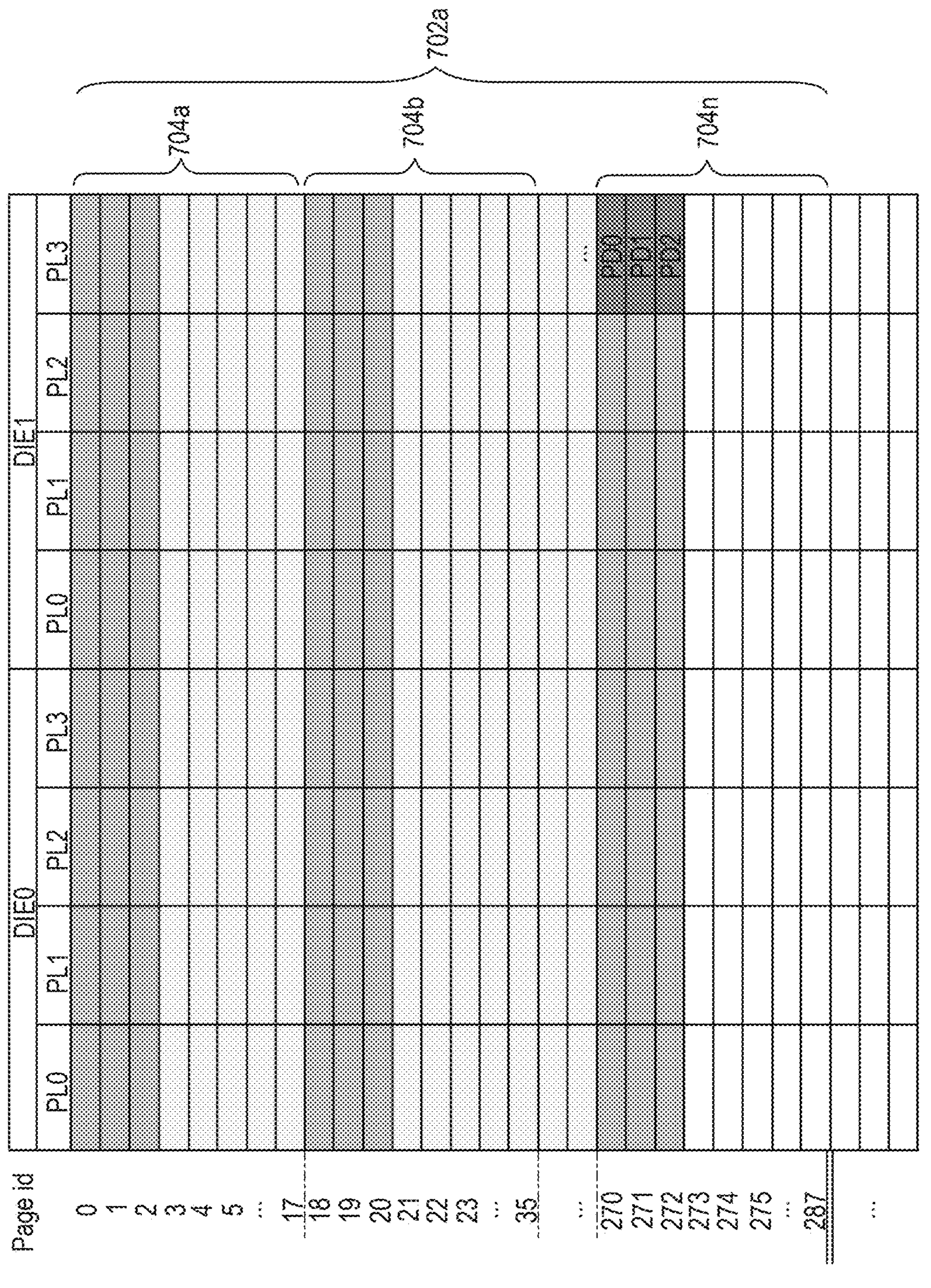

As shown in FIG. 7B, after performing XOR operations on data of the first three super pages of each round 704 except the last round 704*n*, the RAID encoding operation proceeds to reading data from the source block. For example, the data read from the source block will be written into the first three super pages (e.g., super pages 270-272) of the last round 704*n*. The data read from the source block can first be stored in the parity buffers, before being written to the target block. The memory controller can further perform XOR operations on the data read from the source block and the results of XOR operations stored in the parity buffer, to generate the RAID parity data. For example, the memory controller can (1) perform an XOR operation on the data to be written to super page 270 and the result of the XOR operations on super page 0, super page 18, super page 36, . . . , and super page 252, in order to generate RAID parity data (PD 0) corresponding to super page 0, super page 18, super page 36, . . . , and super page 252 and super page 270; (2) perform an XOR operation on the data to be written to super page 271 and the result of the XOR operations super page 1, super page 19, super page 37, . . . , and super page 253, in order to generate RAID parity data (PD 1) corresponding to super page 1, super page 19, super page 37, . . . , super page 253 and super page 271; and (3) perform an XOR operation on the data to be written to super page 272 and the result of the XOR operations super page 2, super page 20, super page 38, . . . , and super page 254, in order to generate RAID parity data (PD 2) corresponding to super page 2, super page 20, super page 38, . . . , super page 254 and super page 273.

The RAID parity data (e.g., PD0, PD1, PD2) can then be written to the target block 700 with the data to be written to super pages 270-272. The parity buffers (e.g., parity buffers 0-2) can be released to be used in the next cycle of the RAID encoding operation.

Figure 7C:
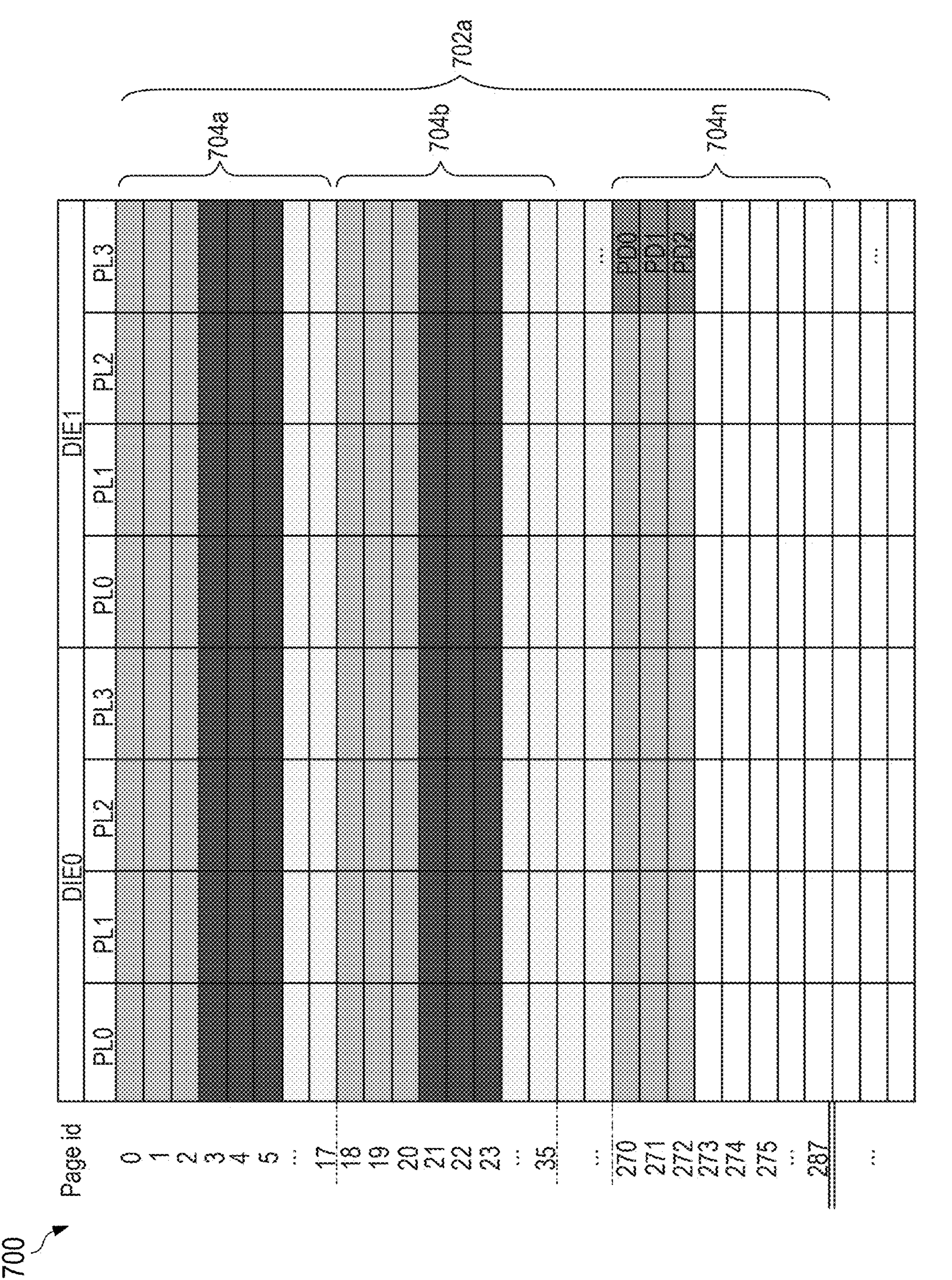

In the second cycle of the RAID encoding operation, as shown in FIG. 7C, data in the fourth to sixth super pages of each round 704 are read, so that the memory controller can generate corresponding RAID parity data by performing XOR operations on the data being read. For example, data in super pages 3-5 of the first round 704*a* are read and stored in one or more parity buffers (e.g., parity buffers 0-2) of the memory controller. In some implementations, data in the super page (e.g., super page 3) associated with the lower page are stored in parity buffer 0, data in the super page (e.g., super page 4) associated with the middle page are stored in parity buffer 1, and data in the super page (e.g., super page 5) associated with the upper page are stored in parity buffer 3. After reading the data in super pages 3-5 of the first round 704*a*, data in super pages 21-23 of the second round 704*b* are read and stored in the parity buffers. For example, data in super page 21 are stored in parity buffer 0, data in super page 22 are stored in parity buffer 1, and data in super page 23 are stored in parity buffer 2. Similarly, data in the fourth to sixth super pages of the third round to the second last round can be read and stored in the parity buffers.

The memory controller can perform XOR operations on the data stored in the parity buffers to generate corresponding RAID parity data. For example, the memory controller can perform an XOR operation on super page 3, super page 21, super page 39, . . . , and super page 255, which are stored in parity buffer 0. The result of the XOR operation can also be stored in parity buffer 0. Similarly, the memory controller can perform an XOR operation on super page 4, super page 22, super page 40, . . . , and super page 256, which are stored in parity buffer 1, and then store the result of the XOR operation in parity buffer 1. The memory controller can perform an XOR operation on super page 5, super page 23, super page 41, . . . , and super page 257, which are stored in parity buffer 2, and then store the result of the XOR operation in parity buffer 2.

Figure 7D:
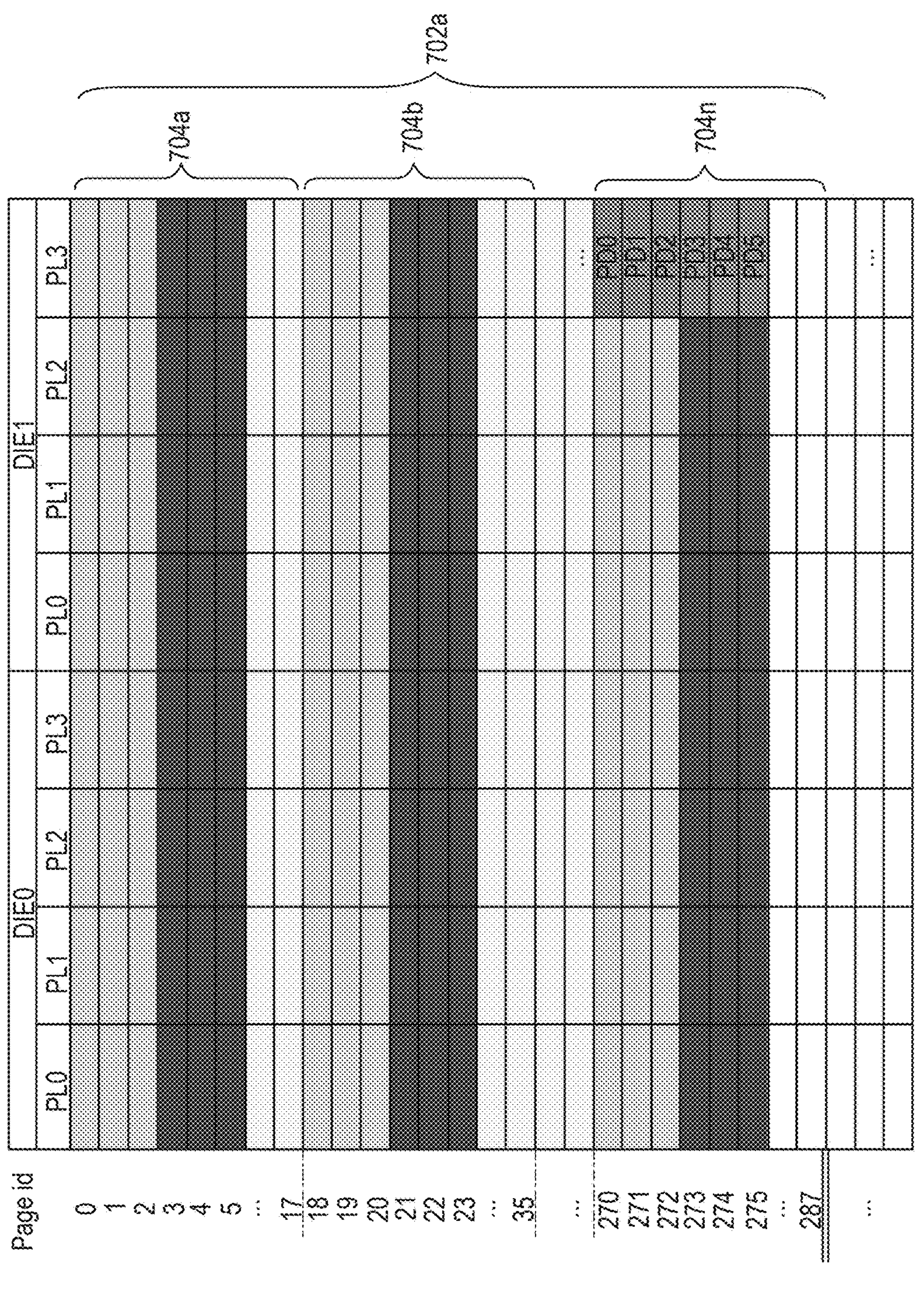

As shown in FIG. 7D, after performing XOR operations on data of the fourth to sixth super pages of each round 704 except the last round 704*n*, the RAID encoding operation proceeds to reading data from the source block. For example, the data read from the source block will be written into the fourth to sixth super pages (e.g., super pages 273-275) of the last round 704*n*. The data read from the source block can be stored in the parity buffers. The memory controller can further perform XOR operations on the data read from the source block and the results of XOR operations stored in the parity buffer, to generate the RAID parity data. For example, the memory controller can (1) perform an XOR operation on the data to be written to super page 273 and the result of the XOR operations on super page 3, super page 21, super page 39, . . . , and super page 255, in order to generate RAID parity data (PD 3) corresponding to super page 3, super page 21, super page 39, . . . , super page 255 and super page 273; (2) perform an XOR operation on the data to be written to super page 274 and the result of the XOR operations super page 4, super page 22, super page 40, . . . , and super page 256, in order to generate RAID parity data (PD 4) corresponding to super page 4, super page 22, super page 40, . . . , and super page 256 and super page 274; and (3) perform an XOR operation on the data to be written to super page 275 and the result of the XOR operations super page 5, super page 23, super page 41, . . . , and super page 257, in order to generate RAID parity data (PD 5) corresponding to super page 5, super page 23, super page 41, . . . , and super page 257 and super page 275.

The RAID parity data (e.g., PD3, PD4, PD5) can then be written to the target block 700 with the data to be written to super pages 273-275. The parity buffers (e.g., parity buffers 0-2) can be released to be used in the next cycle of the RAID encoding operation.

Following the process as illustrated in FIGS. 7A-7D, the RAID encoding operation can read data from the rest of the super pages in the target block 700, generate corresponding RAID parity data, and store the corresponding parity data in the target block 700. In some implementations, the pages in the target block 700 can be organized into rounds 704 and funds 702 in a different way. For example, each fund 702 can include a different number of rounds 704, and each round 704 can include a different number of pages.

Figure 8:
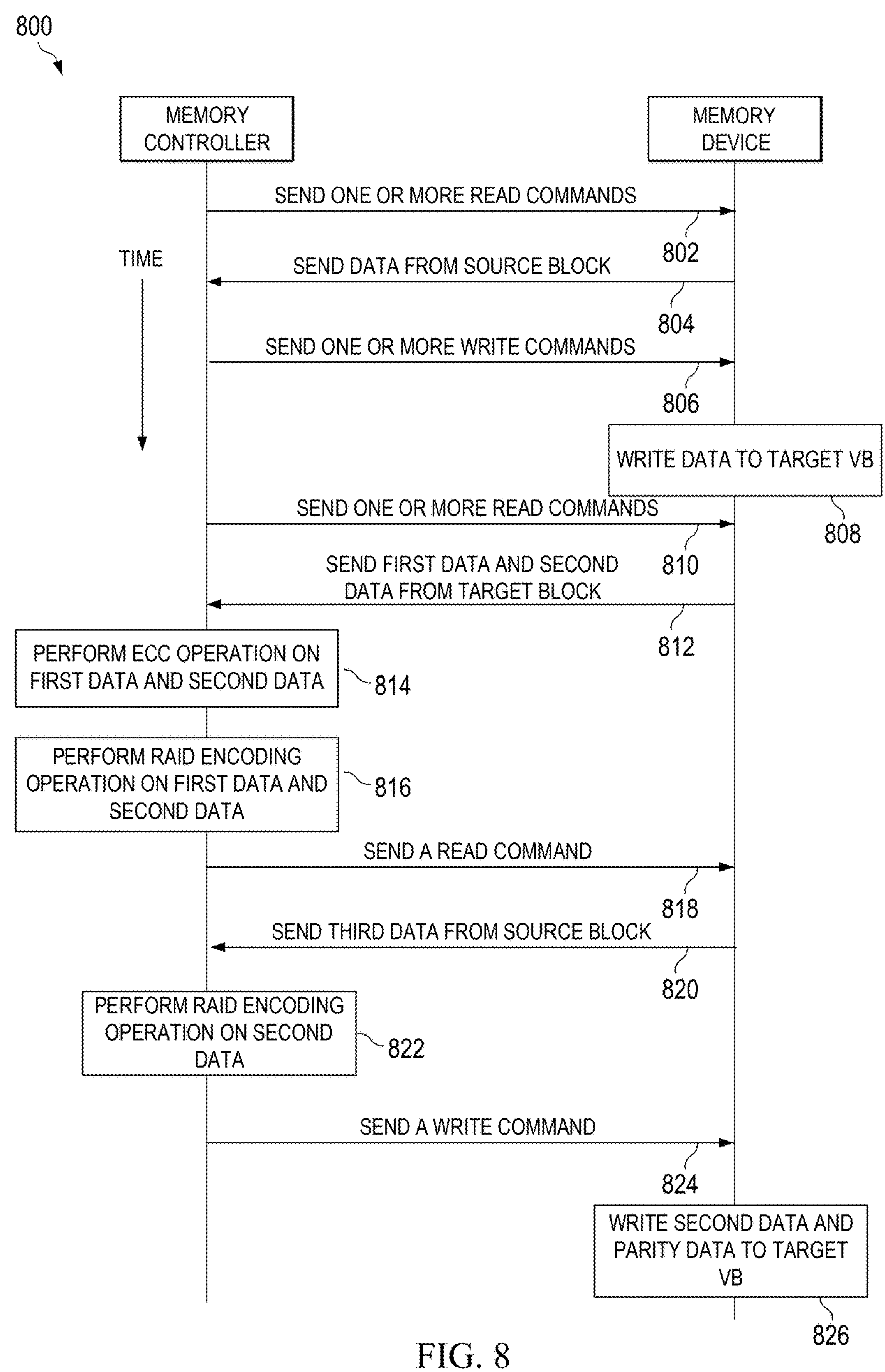
FIG. 8 illustrates an example method of performing a RAID encoding operation, according to some aspects of the present disclosure.

FIG. 8 illustrates an example method 800 of performing a RAID encoding operation, according to some aspects of the present disclosure. The method 800 can be performed by a memory system that includes a memory controller and a memory device controlled by the memory controller. The memory controller is configured to perform GC operations to move valid data from a source block to a target block (e.g., target block 700 of FIG. 7A). The memory controller is further configured to perform RAID encoding operations to generate RAID parity data for the GC data moved from the source block to the target block. In some implementations, the memory controller includes a processer and a buffer (e.g., one or more parity buffers). The parity buffers can store GC data and RAID parity data before they are sent to the memory device for storage.

At 802, the memory controller sends one or more read commands to the memory device. The one or more read commands indicate to read valid data from the source block of the memory device.

At 804, in response to the read commands, the memory device sends data from the source block to the memory controller.

At 806, the memory controller sends one or more write commands (e.g., first write commands) to the memory device. The one or more write commands indicate to write the valid data retrieved from the source block to the target block of the memory device.

At 808, in response to the write commands, the memory device can write the valid data retrieved from the source block to the target block. In some implementations, by sending the one or more read commands and the one or more write commands, the memory controller can instruct the memory device to move all the valid data in the source block to the target block, so that the source block can be erased and ready for writing new data.

At 810, when a size of the data in the target block reaches a threshold (e.g., data are written to all rounds except the last round of the first fund of the target block), the memory controller sends one or more read commands (e.g., first read command and second read command) to the memory device. The one or more read command indicates to read first data and second data from the target block. For example, the first read command indicates to read the first data from a portion of the pages (e.g., super pages 0-2 of FIG. 7A) in the first round (e.g., the first round 704*a* of FIG. 7A) of the target block. The second command indicates to read the second data from a portion of the pages (e.g., super pages 18-20 of FIG. 7A) in the second round (e.g., the second round 704*b* of FIG. 7A) of the target block. In some implementations, the memory controller can send more read commands that indicate to read data from pages in other rounds (e.g., the third round, the fourth round, . . . , the second last round) of the target block.

At 812, in response to the read commands, the memory device sends the first data and the second data to the memory controller. The first data and the second data can be stored in the parity buffer of the memory controller.

At 814, the memory controller can perform an error correction operation on the first data and the second data, for example, based on error correction codes, to detect and correct erroneous bits in the first data and the second data.

At 816, the memory controller performs a RAID encoding operation on the first data and the second data. The RAID encoding operation includes performing XOR operations on the first data, and the second data, and storing the result of the XOR operations in the parity buffer. In some implementations, the memory controller performs RAID encoding operation on data in other rounds (e.g., the third round, the fourth round, . . . , the second last round) of the target block. For example, on top of the result of the XOR operation on data read from pages in the first and second rounds, the memory controller can perform an XOR operation on such result and data read from pages in the third round. On top of the result of the XOR operation on data read from pages in the first, second and third rounds, the memory controller can perform an XOR operation on such result and data read from pages in the fourth round, and so on. It should be noted that the memory controller may perform operation 816 before, after, or at the same time as operation 814.

At 818, after performing the RAID encoding operations on data read from all rounds except the last round in the fund, the memory controller can send a read command (e.g., third read command) to the memory device. The read command indicates to read third data from the source block.

At 820, in response to the read command, the memory device sends the third data from the source block to the memory controller.

At 822, the memory controller performs a RAID encoding operation on the third data, for example, by performing an XOR operation on the third data and the result of XOR operations on data read from all rounds except the last round in the fund. As such, the memory controller generates the RAID parity data for data from a portion of the pages (e.g., the first three super pages, the fourth to the sixth super pages, or the seventh to the nineth super pages) in all rounds of the fund.

At 824, the memory controller sends a write command (e.g., second write command) to the memory device. The write command indicates to write the third data and the RAID parity data to target block, for example, to a portion of pages (e.g., super pages 270-272) in the last round (e.g., the last round 704*n* of FIG. 7B) of the fund.

At 826, in response to the write command, the memory device writes the third data and the RAID parity data in the target block. The parity buffer can be released for another cycle of encoding operation, for example, to generate RAID parity data corresponding to the fourth to the sixth super pages of each round.

In some implementations, in the next cycle of encoding operations, the memory controller can send a read command (e.g., fourth read command) that indicates to read data (e.g., fourth data) from a portion of pages (e.g., super pages 3-5 of FIG. 7C) in the first round, and a read command (e.g., fifth read command) that indicates to read data (e.g., fifth data) from a portion of pages (e.g., super pages 21-23 of FIG. 7C) in the second round. The memory controller can generate corresponding RAID parity data, for example, by performing XOR operations on the fourth data, the fifth data, data read from the fourth to the sixth super pages of the third to the second last round of the fund, and data read from the source block and will be written to the fourth to the sixth pages (e.g., super pages 273-275 of FIG. 7D) of the last round. The memory controller can send the corresponding RAID parity data to the target block for storage, e.g., in the last round.

Figure 9:
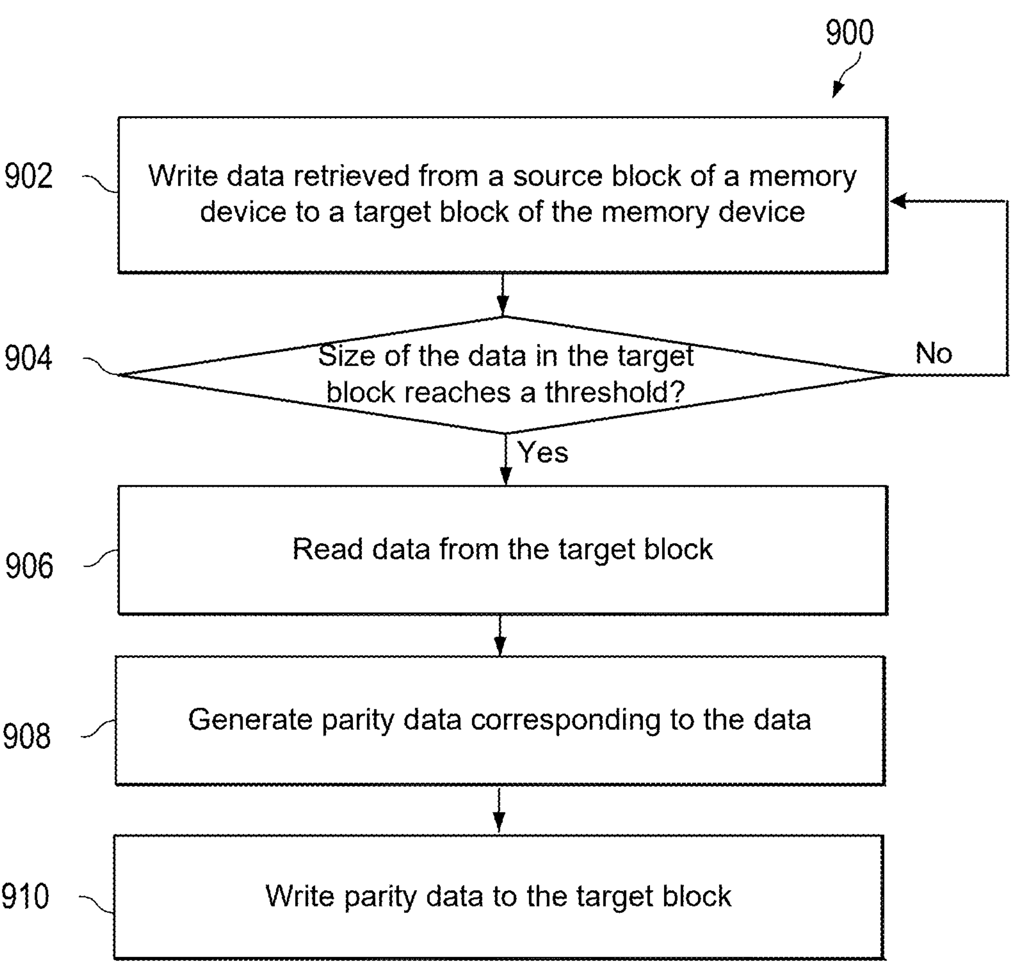
FIG. 9 illustrates a flowchart of an example process of operating a memory system, in accordance with some aspects of the present disclosure.

FIG. 9 illustrates a flowchart of an example process 900 of operating a memory system, in accordance with some aspects of the present disclosure. Process 900 can be performed by any suitable device or system as described herein, for example, according to the example techniques described with respect to FIGS. 1-8. For example, process 900 can be performed by a memory system, such as the memory system 102 of FIG. 1 that includes a memory device 104 and a memory controller 106. The memory device 104 can include one or more memory blocks that are organized into super blocks (e.g., super block 600 of FIG. 6A) under RAID structure.

The operations shown in process 900 may not be exhaustive and other operations can be performed as well before, after, or in between any of the illustrated operations. Further, some of the operations may be performed simultaneously, or in a different order than shown in FIG. 9. In some implementations, some of the operations may be performed by one or more components of a device or a system, such as, a peripheral circuit of the memory device, or a memory controller of a memory system.

At 902, data retrieved from a source block of the memory device are written to a target block (e.g., target block 700 of FIGS. 7A-7D) of the memory device. In some implementations, during a GC operation, data retrieved from the source block are written to pages of target block in order of the page numbers, e.g., sequentially from page 0 to page N.

At 904, whether a size of the data in the target block reaches a threshold is determined. If the size of the data in the target block has reached the threshold, for example, data have been written to all rounds (rounds 704 of FIG. 7A) but the last round (e.g., last round 704*n* of FIG. 7A) of the first fund (e.g., first fund 702*a* of FIG. 7A) of the target block, the process proceeds to 906. If the size of the data in the target block has not reached the threshold, the process goes back to 902 to continue to write data retrieved from the source block to the target block.

At 906, the memory controller reads data from the target block. In some implementations, data are read from the target block in a different order from the page numbers. For example, pages in the target block can be organized in rounds. A first set of pages can include pages (e.g., super pages 0-17 of FIGS. 7A-7D) in the first round (e.g., the first round 704*a* of FIGS. 7A-7D); a second set of pages can include pages (e.g., super pages 18-35 of FIGS. 7A-7D) in the second round (e.g., the second round 704*b* of FIGS. 7A-7D); and so on. Immediately after reading first data from a first page (e.g., super pages 0-2 that are associated with a first word line WL0) of the first set of pages, the memory controller reads second data from a second page (e.g., super pages 18-20 that are associated with a second word line WL1).

At 908, the memory controller generates parity data (e.g., RAID parity data) corresponding to the data read from the target block. In some implementations, the parity data are generated by performing XOR operations on the first data, the second data, and in some cases, data read from super pages 36-38 in the third round, data read from super pages 54-56 in the fourth round, and so on. The result of the XOR operations can be stored in a parity buffer (e.g., parity buffer 508 of FIG. 5) of the memory controller.

In some implementations, before 910, the memory controller reads third data from the source block. The memory controller can perform an XOR operation on the third data and the result of the XOR operations performed on data read from the target block, to generate parity data (e.g., PD0-PD2 of FIG. 7B).

At 910, the parity data are written to the target block. In some implementations, the parity data are written to pages (e.g., super pages 270-272 of FIG. 7B) in the last round. For example, the parity data can be written to the last round together with the third data.

In some implementations, a first cycle of RAID encoding operation on GC data in the target block concludes at 910. After 910, the memory controller can perform a second cycle of RAID encoding operation on GC data in the target block. For example, the memory controller can read fourth data from a third page (e.g., super pages 3-5 that are associated with the first word line WL0) of the first set of pages, and read fifth data from a fourth page (e.g., the super pages 21-23 that are associated with the second word line WL1) of the second set of pages. For example, the fifth data is read immediately after reading the fourth data. The memory controller can generate parity data by performing XOR operations on the fourth data, the fifth data, and in some cases, data read from super pages 39-41 in the third round, data read from super pages 57-59 in the fourth round, and so on. The parity data (e.g., PD3-PD5 of FIG. 7D) can be written to pages (e.g., super pages 273-275) of the last round.

The present disclosure also provides a non-transitory computer-readable storage medium. The non-transitory computer-readable storage medium stores one or more instructions (e.g., firmware of a memory controller) that are executable by a computer system. When being executed by the computer system, the instructions in the storage medium can implement method for managing parity data generation as shown in FIGS. 6A-9.

The non-transitory computer-readable storage medium can be an internal storage unit of the device described in any of the foregoing embodiments. For example, the non-transitory computer-readable storage medium can be a hard disk or an internal memory of the device. The non-transitory computer-readable storage medium can also be an external storage device of the device, such as a plug-in hard disk, a smart media card (SMC), a secure digital (SD) card, a flash card, etc. Further, the non-transitory computer-readable storage medium can also include an internal storage unit and the external storage device.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A method of operating a memory system, comprising:

writing data retrieved from a source block of a memory device of the memory system to a target block of the memory device; and in response to determining a size of the data in the target block reaches a threshold:

reading the data from the target block;

generating parity data corresponding to the data; and writing the parity data to the target block.

2. The method of claim 1, wherein the target block comprises a first set of pages associated with a first word line and a second set of pages associated with a second word line, and wherein reading the data from the target block comprises:

reading first data from a first page of the first set of pages; and reading second data from a first page of the second set of pages.

3. The method of claim 2, wherein the second word line is adjacent to the first word line in the memory device.

4. The method of claim 2, wherein generating parity data comprises generating first parity data, wherein generating the first parity data comprises:

performing a first exclusive OR (XOR) operation on the first data and the second data.

5. The method of claim 4, wherein a result of the first XOR operation is stored in a buffer of a memory controller of the memory system.

6. The method of claim 5, wherein the method further comprises reading third data from the source block, wherein generating the first parity data comprises:

performing a second XOR operation on the third data and the result of the first XOR operation.

7. The method of claim 4, wherein reading the data from the target block comprises:

reading fourth data from a second page of the first set of pages; and reading fifth data from a second page of the second set of pages, wherein the fourth data and the fifth data are read after writing the first parity data to the target block, and wherein generating the parity data comprises generating second parity data, wherein generating the second parity data comprises:

performing a third XOR operation on the fourth data and the fifth data.

8. The method of claim 1, wherein reading the data from the target block comprises:

performing an error correction operation on the data using error correction codes.

9. A memory system, comprising a memory device and a memory controller configured to control the memory device, wherein the memory system is configured to perform operations comprising:

writing data retrieved from a source block of the memory device to a target block of the memory device; and in response to determining a size of the data in the target block reaches a threshold:

reading the data from the target block;

generating parity data corresponding to the data; and writing the parity data to the target block.

* * * * *